Feb. 13, 1968  E. A. GRAETZ  3,368,344
LOCKING CHAIN LINK
Filed July 28, 1965
Fig. 3
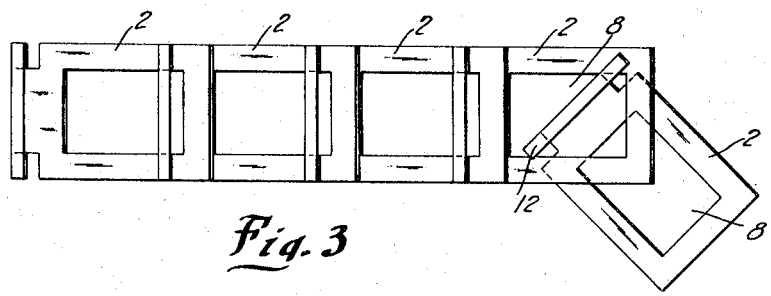
Fig. 4
Fig. 1
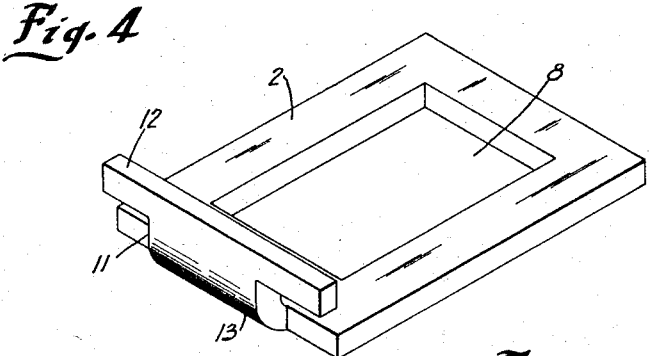
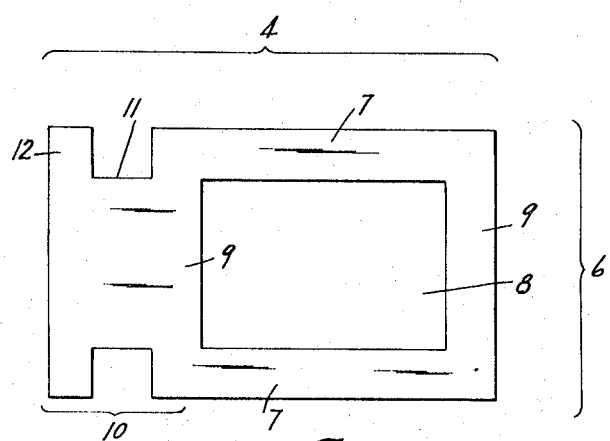
Fig. 2
INVENTOR.
EDWARD A. GRAETZ
BY
Lieber & Nilles
ATTORNEY

United States Patent Office 3,368,344
Patented Feb. 13, 1968

3,368,344
LOCKING CHAIN LINK
Edward A. Graetz, Pound, Wis. 54161
Filed July 28, 1965, Ser. No. 475,524
3 Claims. (Cl. 59—78)

ABSTRACT OF THE DISCLOSURE

A power transmission chain formed of a plurality of interlocking links of unitary sheet metal construction and which are removable and/or replaceable without resort to separate locking devices or tools.

---

This invention relates to chains formed of a plurality of interlocking links and more particularly to an improved construction for said links. Such chains form a highly desirable power transmission means because of the ability to replace a worn or damaged link in the chain without replacing or shortening the entire chain.

Background

While chains formed of a plurality of interlocking links are available in the prior art, such chains have often been unsatisfactory from a practical standpoint by requiring complicated forming operations for their manufacture, the use of separate locking means, such as pins or wedges, to hold the chain together, or the use of locking structures which extend beyond the sides of the individual links. Further, such chains have often been unusable with a sprocket drive power transmission means because the low pitch precision of the chain prevented satisfactory engagement with the teeth of the sprocket. Such chains have also tended to generate excessive noise, and to slip or kink in operation.

Summary

It is, therefore, an object of this invention to provide an improved interlocking chain link which is simple and inexpensive in design, construction, and manufacture.

It is a further object of this invention to provide an interlocking chain link which requires no separate locking means and in which the width of the locking structure is the same as the width of the chain.

Yet another object of this invention is to provide a chain formed of such interlocking links which is suitable for use as a power transmission means as it attains excellent link pitch precision with a minimum of slippage, kinking, and noise.

Briefly, the invention provides a chain link constructed of a rectangular sheet of flat material having a rectangular central aperture. The sheet also has a locking means extending from one end thereof which includes an upturned portion, narrower in width than the sheet of flat material. The upturned portion has a bar portion, equal in width to the sheet, on the upper end thereof.

A chain is formed of such links by inserting the bar portion of one link diagonally into the central aperture of the preceding link. The links are retained together by bringing them into longitudinal alignment.

The drawings

The invention, both as to its structure and features, may be better understood by reference to the following specification and drawings forming a part thereof, in which:

FIGURE 1 is a perspective view of a chain link of the present invention;

FIGURE 2 is a view of a blank from which the chain link of FIGURE 1 may be formed;

FIGURE 3 is a plan view of a chain formed from such links; and

FIGURE 4 is a side view of the chain of FIGURE 3.

Detailed description

Referring now to the drawing and particularly to FIGURE 1, there is shown therein a chain link of the present invention indicated generally by the numeral 2. This link is preferably formed of a sheet of flat material, such as sheet metal, of sufficient thickness to carry the loads imposed upon the chain link. The flat sheet of material has a length 4 and a width 6 which are likewise determined by the application to which the chain will be put.

Link 2 contains a central aperture 8 which is also rectangular in cross section, the aperture 8 being defined by the sides 7 and ends 9.

Locking means 10 is formed on one end 9 of link 2 and consists of a reduced neck portion 11, narrower in width than the overall width 6 of link 2, and a head or bar portion 12 which is approximately equal in width to width 6 of link 2. As may be seen from FIGURE 2, the width of the neck portion 11 is substantially equal to the width of aperture 8, and this neck portion 11 is bent or turned upward through approximately 90°, as shown in FIGURE 1, to form the completed link.

FIGURE 3 shows a chain constructed of the links shown in FIGURE 1 and FIGURE 2. The chain is formed by inserting the head or bar portion 12 of one link diagonally through the central aperture 8 of the preceding link. As will be appreciated from FIGURE 3, the diagonal dimension of central aperture 8 must be at least sufficient to receive the head or bar 12 and permit the same to be passed through the opening as illustrated at the right hand side of FIGURE 3. The chain is assembled as shown by passing the head diagonally through the opening of the preceding link and then rotating the same so that the reduced neck portion is received by the sides 7 of the preceding link with the links longitudinally aligned, as shown in FIGURE 3.

As may be seen from the foregoing, the simple, mechanically rugged chain link of the present invention forms a chain without the use of separate locking means or of locking structures that exceed the width of the chain. Further, since the portions of aperture 8 and upturned portion 11 form a bearing surface across their entire width any tendency of the chain to slip or kink is minimized. Similarly, the pitch between adjacent central apertures 8 is closely controlled, permitting a chain to be used in a highly satisfactory manner in a sprocket drive. Furthermore, any one or more of the links may be readily removed and replaced without need for special tools, and the chain formed thereby has the links effectively interlocked against displacement in actual use.

As indicated above, the chain links may be conveniently stamped from sheet metal stock in a rapid and economical manner, and may be sized and formed of a suitable gauge metal to meet specific requirements. Also, while dimensions are not particularly critical, the reduced neck portion 11 of each link must be capable of reception transversely of the opening 8 of the preceding link, and in order not to adversely affect the strength of the chain formed by the links 2, it is generally desirable to keep the width of the neck portion 11 as close as possible to the transverse dimension or width of opening 8 without interference with the articulation of the chain.

Furthermore, while the length of the neck portion 11 must be sufficient to receive the side portions 7 and must therefore be at least equal to the thickness of the material from which the links are formed, it is advantageous to make the length of the neck somewhat longer than the thickness of the sheet stock to permit freedom in arcuate articulation of the chain about the drive wheels or sprockets (not shown). For this same reason, it is also desirable to bend the neck portion 11 in a smooth arc, as at 13 in FIG. 1.

The enlarged head or bar 12 may, of course, by of any desired width as long as it is greater than the transverse dimension or width of the opening 8 of the preceding link so as to interlock therewith upon longitudinal alignment of the links. However, this head portion 12 must be capable of reception diagonally within the opening 8 as illustrated in FIG. 3. Accordingly, the diagonal dimension of the aperture 8 must be at least equal to the width of the head less one-half of the amount by which the neck 11 is narrower than the head to thus permit one side of the neck to be placed over the corner of the preceding link as defined by its aperture 8 so that the opposite side of the head can clear the diagonally opposite corner as shown.

These interlocking links have many advantages and potential uses, and may be utilized to drive, convey or scrap. It is therefore not desired or intended to limit the use or application thereof to any particular embodiment or field of service.

Various modes of carrying out the invention are contemplated as being within the scope of the following claims particularly pointing out and distinctly claiming the subject matter which is regarded as the invention.

I claim:

1. A chain link comprising, a unitary sheet metal stamping having uniform thickness throughout and formed with a rectangular aperture bounded by side and end walls lying in a common plane and providing a flat rectangular body portion, one of said end walls having a neck portion of substantially the same width as that of the aperture extending outwardly therefrom and terminating in a head of substantially the same width as said rectangular body portion, said neck portion being bent in a smooth arc through approximately 90° commencing in said common plane at the junction of said neck portion with said one end wall to thereby position said head in a plane perpendicular to said common plane, said neck portion being of sufficient length to locate said head laterally of said one end wall a distance at least as great as the thickness of said stamping.

2. A chain link according to claim 1, wherein the diagonal dimension of the rectangular aperture is greater than the width of the head.

3. A chain comprised of a plurality of chain links according to claim 1.

References Cited

UNITED STATES PATENTS

| 255,994 | 4/1882 | Howe | 74—248 |
| 261,243 | 7/1882 | Low | 74—248 |
| 1,403,674 | 1/1922 | Dull | 59—78 |

FOREIGN PATENTS

| 542,587 | 5/1922 | France. |
| 104,644 | 3/1917 | Great Britain. |

RICHARD J. HERBST, *Primary Examiner.*

G. P. CROSBY, *Assistant Examiner.*